Nov. 5, 1974  C. HENAULT  3,846,076
ANTI-POLLUTION CONTROL DEVICES FOR INTERNAL
COMBUSTION ENGINES
Filed June 19, 1972

United States Patent Office 3,846,076
Patented Nov. 5, 1974

3,846,076
ANTI-POLLUTION CONTROL DEVICES FOR
INTERNAL COMBUSTION ENGINES
Claude Henault, Billancourt, France, assignor to Regie
Nationale des Usines Renault, Billancourt, and Automobiles Peugeot, Paris, France
Filed June 19, 1972, Ser. No. 264,333
Claims priority, application France, June 22, 1971,
7122690
Int. Cl. G01n 31/10; H01v 1/32
U.S. Cl. 23—254 E                                      7 Claims

ABSTRACT OF THE DISCLOSURE

Means of quantitative detection of the content of at least one noxious constituent of exhaust gases are mounted in a by-pass on the exhaust pipe and transmit this content in the form of an electric signal to an integrator-convertor which in turn transmits this information to an electronic computer controlling the operating parameters of the engine.

---

The invention relates to an anti-pollution control system for internal combustion engines with electronically-controlled feed, in particular to electronic injection engines.

The importance is known of the results obtained from the use of electronic means in the feed and control of engines, particularly in the field of anti-pollution control. However the present systems, used for controlling an engine in accordance with a pre-established program based on results of tests which are not always an exact expression of real conditions, do not make full use of all the possibilities of electronic means, particularly of electronic injection systems.

This invention relates to a device for regulating the electronic control means of an engine, in particular controlling the richness of the mixture supplied to the said engine by means of an electronic computer regulating the fuel injection, characterized in that means for detecting the content of at least one noxious constituent of the exhaust gases, mounted on the exhaust pipe, transmit this content in the form of an electrical signal which is processed by means of an integrator-converter which in turn transmits this information to an electronic computer of conventional type controlling the engine functioning parameters, such as for instance the fuel injection, and hence the regulation of the corresponding richness of the mixture supplied, for the purpose of correlative reduction of the constituent or constituents detected.

This computer likewise processes the usual information of intake pressure, engine speed, air intake temperature, and so on.

The introduction of this new datum, which may be for instance the carbon monoxide content of the exhaust gases, into the engine regulation system, means that there is permanently added to this a closed-loop control system automatically correcting and compensating for defects in dependence on the control conditions. The increase in cost caused by such a regulating system is compensated by the possibility of obtaining decreased control sensitivity of other operating parameters, and even the suppression of some of them.

It is another object of the invention to utilize means of detection compatible with the price and conditions of use of the vehicle. Conventional gas analysers, of the physico-chemical or infra-red radiation type cannot be employed because of their price, their weight and dimensions and conditions of operation, in particular their too long response period, for fixed installations.

The gas detector forming the subject matter of the invention comprises at least one thermo-electric element disposed between two identical flows of mixed gases. The "hot" and "cold" surfaces of this element are swept respectively by each of the flows. The "hot" surface, that is to say the terminal junction of the thermo-electric elements, designed to be brought to the maximum temperature, is covered with a catalytic covering intended to trigger off an exothermic oxidization reaction in the presence of the reaction gas to be detected.

In the absence of catalytic reaction, that is to say of reaction gas, in the case of the use of a catalyst with a selective action on this gas, the two terminals of the thermo electric element are at the same temperature and the element does not supply any current.

In the presence of reaction gas the reaction is triggered off immediately, in view of the use of the catalyst in its operational temperature zone. The thermo-electric element then supplies a current whose voltage is substantially proportional to the intensity of the catalytic exothermic reaction, and hence to the content of reaction gas.

The resulant voltage is then amplified and transmitted to a generator-converter and via a relay-memory to the electronic computer which utilizes this information, in association with the other engine regulating parameters to control for example the regulation of the richness of the mixture supplied by the injection time, or the regulation of the engine ignition advance.

This method of detection has the advantage of being direct and having a very short response time. As the exothermic catalytic reaction begins at the level of the catalyst, that is to say at the surface of the hot junction of the thermoelectric element, its translation into the form of current is practically instantaneous, due to the fact of the thinness and high porosity of the catalyst layer. Its cost is compatible with the economics of motor vehicle production.

An example of embodiment of a device in accordance with the invention, applied to the regulation of an injection engine by permanent control of the carbon monoxide ratio in the exhaust is described below with refrence to the attached drawings, in which.

Figure 1:
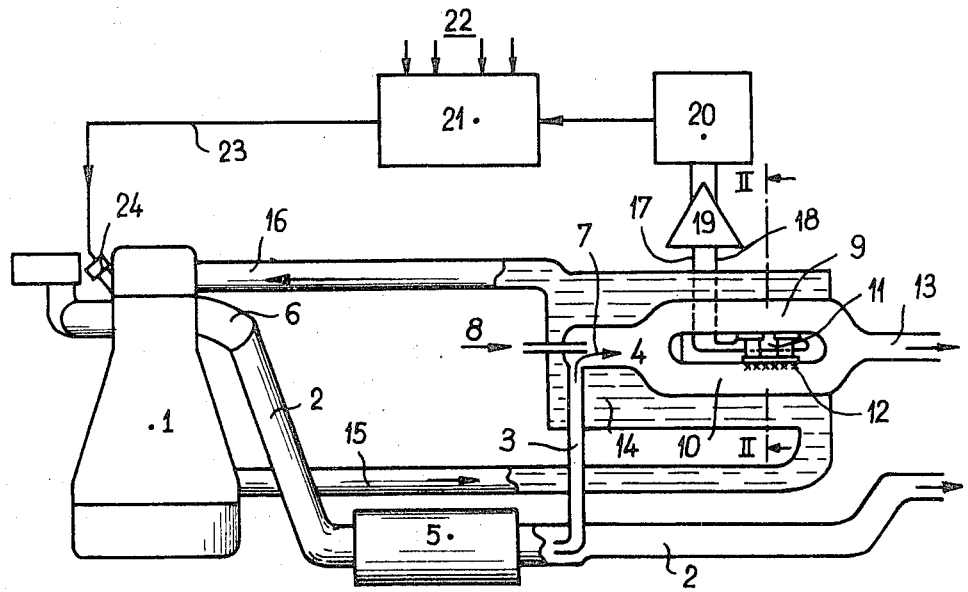
FIG. 1 is a general diagram of the device.

In FIG. 1 it can be seen that the engine 1 has an exhaust pipe 2 which is connected to a sampling pipe 3, of smaller diameter, feeding the detecting element 4 with exhaust gas. This gas sampling member 3 is advantageously situated immediately downstream from the silencer 5, in order to collect gases already partly cooled in going through the silencer. Possibly the gases may be collected at the outlet of the exhaust collector 6, which shortens the path between the formation of these gases in the engine 1 and their point of detection in the detector 4, subject to it being possible to obtain a sufficient cooling in the detector 4. There is thus ensured a smaller time between their formation and their detection, and hence a shorter response time.

Figure 2:
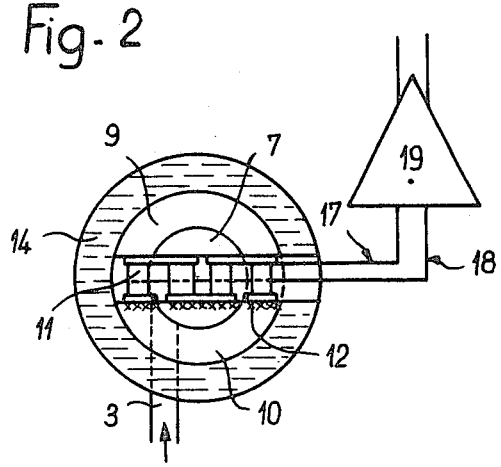
FIG. 2 is a cross-section along the line II—II of the carbon monoxide detector.

The detector 4 comprises an homogeneization and cooling chamber 7 into which the duct or pipe 3 opens tangentially, as can be seen in FIG. 2, in order to cause an eddying or turbulence of the gases. An additional air inlet 8 is provided in the axis of the chamber 7. The air introduced in excess favours the triggering-off of the catalytic combustion of the carbon monoxide.

This chamber 7 is extended in two independent semi-cylindrical symmetrical branches 9 and 10, between the parallel plane surfaces of which is disposed the thermo-electric element 11 whose hot junction is covered by a layer of catalyst 12 swept by the gases from the branch 10. The branches 9 and 10 then re-unite in a common discharge pipe 13 which may possibly be connected to the exhaust pipe 2.

A cooling jacket 14 of the detector 4, through which circulates a flow of engine coolant water via the pipes 15 and 16 restricts the temperature of the exhaust gases in the detector.

The connecting wires 17 and 18 transmit the voltage arising at the terminals of the cold junction of the thermo-electric element, via an amplifier 19 to an analogical intergrator-converter 20 which transmits the information "carbon monoxide content" to a computer 21, which may be of the type forming the subject matter of the French Patent Application No. 7118.125 filed on the 19th May 1971 in the Applicants' name, acting on the members regulating the engine ignition advance or on the injection times, and in which the reference value to which this information is compared is determined in accordance with the anti-pollution standards.

The connections of the other regulating parameters whose access to the computer 21 is illustrated by the arrows 22, are not shown. The wire 23 transmits the instructions for opening the injectors 24.

In operation, the exhaust gases, previously cooled in the collector 6, the pipe 2 and the silencer 5, are collected by the sampling pipe 3 and after having passed through the cooling jacket 14, penetrate tangentially into the chamber 7 where the introduction of additional air 8 lowers the temperature still further, bringing to them excess air of combustion.

The mixture, homogeneized by the turbulence in the chamber 7, is distributed equally between the branches 9 and 10. In the chamber 10 the presence of carbon monoxide and oxygen coming from the added air immediately triggers-off on the layer of catalyst 12 an exothermic combustion reaction.

The difference in temperature resulting from this between the two surfaces of the thermo-electric element 11 generates a voltage at the two junction terminals of the element which are located on the cold surface on the pipe 9 side.

It is desirable to cool the exhaust gases beforehand so that the catalytic reaction temperature shall be higher than that of the ambient gases. In fact the greater the difference in temperature between the surfaces of the element 11 the greater is the sensitivity and accuracy of the measurement of the voltage. The resultant voltage is expressed by the following equation:

$$\Delta V = \int_{T_0}^{T} \alpha \, dT$$

To being the absolute temperature of the exhaust gases, T the absolute temperature of the catalytic combustion and α being the Seebek coefficient appropriate to the thermo-electric material used, at the temperature To.

By way of example, a conventional thermo-electric lead telluride element may be used, either of the negative type, activated by lead iodide, whose Seebek coefficient is $2.35 \times 10^{-4}$ volts per ° C., or of the positive sodium-activated type having a Seebek coefficient of $2.43 \times 10^{-4}$ volts per ° C., and capable of withstanding working temperature which may reach 300 to 400° C. Elements having a length of about 3 centimeters may be used.

Although thermo-electric elements are known, of silicon-germanium for instance, capable of withstanding higher temperatures, it is desirable to operate the device at a temperature as low as possible so that while maintaining the conditions of sensitivity of measurement mentioned above, the oxidization and wear of the detector element is restricted and its life prolonged.

The selective catalytic oxidization of the carbon monoxide may advantageously be effected on an active porous alumina layer supporting a low percentage of platinum and oxidization promoters of the type of manganese, iron, nickel or cobalt. The very small quantity of catalyst necessary makes it possible to envisage this application of platinum, even for large scale motor manufacture.

Such catalysts are active at temperatures from zero to about 350° C.

As the thermal inertia of the catalyst layer is very low, and its surface swept by the exhaust gases very considerable, the equalization of the temperatures between the surfaces of the thermo-electric element is very rapid as soon as the catalytic combustion finishes, as also is the correlated disappearance of the voltage indicating the presence of carbon monoxide.

What is claimed is:

1. A quantitative detection device adapted to detect a component of a motor exhaust gas which comprises a housing which encloses a chamber, entrance means for flow of a sample of exhaust gas tangentially into the chamber, discharge means spaced from the said entrance means for the gas to flow as one stream from the chamber, and intermediate the entrance means and discharge means a thermo-electric element disposed in the chamber which divides the chamber into two symmetrical sections, said thermo-electric element having a hot surface exposed to one section and a cold surface exposed to the other section, said hot surface having a catalytic coating which initiates an exothermic reaction in the exhaust gases whereby an electric current is produced by the thermo-electric element.

2. The device of Claim 1 wherein the housing encloses a water jacket about the chamber for cooling the gas.

3. The device of Claim 1 wherein the thermo-electric element is an element with lead telluride.

4. The device of Claim 1 wherein the said hot surface has a layer thereon of activated alumina containing about 0.5% platinum and oxides of manganese, iron, cobalt and nickel.

5. A device as claimed in Claim 1 in which an intake of additional air is provided in the chamber of the exhaust gases and the detection and measurement catalytic exothermic reaction is the combustion of the carbon monoxide of the exhaust gases in the presence of an excess of oxygen.

6. In an apparatus for the quantitative detection of a combustible component of an exhaust gas of an engine of a motor vehicle comprising a housing which encloses an elongated chamber, means for introducing said gas tangentially into one end of the chamber, means for discharging the gas from the chamber at the other end thereof, and intermediate the said gas introducing and discharging means a thermo-electric element disposed along the longitudinal axis of the chamber and extending across the width of the chamber thereby dividing the chamber into two symmetrical sections, whereby said gas flowing through the chamber is separated into two streams of substantially equal volume as it flows over the said thermo-electric element, said thermo-electric element having a hot junction on one side thereof having a catalyst on its surface exposed to gases flowing thereover which initiates combustion of the said combustible component and a cold junction on the opposite side thereof which is free from catalyst on its surface exposed to gases flowing thereover whereby a temperature gradient exists between the two surfaces and an electric current is developed by said thermo-electric unit with the voltage being substantially proportional to the intensity of the catalytic combustion.

7. The apparatus of Claim 5 wherein the housing encloses a water jacket about the chamber and the means for discharging gas from the chamber directs the flow of the gas from both sections as a single stream from the apparatus.

References Cited
UNITED STATES PATENTS

| | | | |
|---|---|---|---|
| 1,923,865 | 8/1933 | Handforth | 23—288 R |
| 2,114,383 | 4/1938 | Jacobson | 23—255 E X |
| 2,916,358 | 12/1959 | Valentine et al. | 23—254 E |
| 3,284,165 | 11/1966 | Baumann et al. | 23—255 E |
| 3,460,909 | 8/1969 | Gayle | 23—254 E |
| 3,586,486 | 6/1971 | Kim et al. | 23—254 E |
| 3,687,631 | 8/1972 | Zegel | 23—254 E X |

OTHER REFERENCES

"Materials Used in Semiconductor Devices," by Hogarth John Wiley & Sons, London, 1965, pp. 81–87, Scientific Library.

JOSEPH SCOVRONEK, Primary Examiner

A. TURK, Assistant Examiner

U.S. Cl. X.R.

73—23, 116; 136—205